(12) United States Patent
Parker

(10) Patent No.: US 7,856,334 B2
(45) Date of Patent: Dec. 21, 2010

(54) METHOD FOR CALIBRATING A LASER-BASED SPHERICAL COORDINATE MEASUREMENT SYSTEM BY A MECHANICAL HARMONIC OSCILLATOR

(76) Inventor: David H. Parker, 3919 Deepswoods Rd., Earlysville, VA (US) 22936-9777

( * ) Notice: Subject to any disclaimer, the term of this patent is extended or adjusted under 35 U.S.C. 154(b) by 80 days.

(21) Appl. No.: 12/329,575

(22) Filed: Dec. 6, 2008

(65) Prior Publication Data
US 2009/0125265 A1     May 14, 2009

(51) Int. Cl.
*G01P 21/00* (2006.01)

(52) U.S. Cl. .............................. 702/95; 702/94; 702/97; 702/103; 702/104; 702/150; 702/151; 702/152; 702/155; 702/156; 702/157; 702/158; 359/224; 359/529; 359/638; 359/872; 356/614; 356/615; 356/620; 356/622; 356/4.09; 356/500; 356/459; 356/510; 356/487; 356/498; 356/141.1; 356/139.08; 250/203.2; 250/221; 250/559.33; 430/5; 430/30; 33/293

(58) Field of Classification Search .................. 359/224, 359/529, 638, 872; 356/614, 615, 620, 622, 356/4.09, 500, 459, 510, 487, 498, 141.1, 356/139.08; 250/203.2, 221, 559.33; 430/5, 430/30; 33/293; 702/94, 95, 97, 103, 104, 702/150, 155–158
See application file for complete search history.

(56) References Cited

U.S. PATENT DOCUMENTS

| | | | |
|---|---|---|---|
| 4,704,614 A | 11/1987 | Poirier | |
| 4,714,339 A | 12/1987 | Lau et al. | |
| 4,738,032 A | 4/1988 | Elmer | |
| 5,455,670 A | 10/1995 | Payne et al. | |
| 5,764,360 A | 6/1998 | Meier | |
| 5,861,956 A | 1/1999 | Bridges et al. | |
| 7,101,053 B2 | 9/2006 | Parker | |
| 7,352,446 B2 * | 4/2008 | Bridges et al. | ............. 356/5.13 |

OTHER PUBLICATIONS

Estler, Edmundson, Peggs, and Parker, Large-Scale Metrology—An Update, Annals of the CIRP, vol. 51/2/2002.
ASME B89.4.19-2006, The American Society of Mechanical Engineers.
C.D. Burnside, Electronic Distance Measurement—Chapter 6, Blackwell Scientific Publications, Cambridge, MA.
J. Thewlis, Encyclopaedic Dictionary of Physics, vol. 5, p. 322-323, Macmillan, 1962.

* cited by examiner

*Primary Examiner*—Sujoy K Kundu
(74) *Attorney, Agent, or Firm*—David H. Parker

(57) ABSTRACT

A method is disclosed whereby a laser-based spherical coordinate measurement system is dynamically calibrated. A mechanical oscillator, such as, but not limited to, a Foucault pendulum is used to generate periodic motions which can be fitted to Fourier series models. The residuals between the experimental measurements and the model can provide information which can be used to calibrate the instrument. The calibration information is used to augment the ASME B89.4.19-2006 standard to improve sensitivity to cyclic errors and include the servo systems.

18 Claims, 1 Drawing Sheet

METHOD FOR CALIBRATING A LASER-BASED SPHERICAL COORDINATE MEASUREMENT SYSTEM BY A MECHANICAL HARMONIC OSCILLATOR

FIELD OF INVENTION

The invention is drawn to calibration of a laser-based spherical coordinate measurement system, more commonly known as a laser tracker, by using a mechanical oscillator to produce a rich set of well behaved measurement data.

BACKGROUND OF THE INVENTION

Laser-Based Spherical Coordinate Measurement Systems, more commonly known in the art as Laser Trackers, were introduced in the mid 1980s. See U.S. Pat. No. 4,714,339 Three and Five Axis Laser Tracking Systems to Lau and Hocken; U.S. Pat. No. 5,764,360 Electro-Optical Measuring Device for Absolute Distances to Meier; and U.S. Pat. No. 7,352,446 Absolute Distance Meter that Measures a Moving Retroreflector to Bridges and Hoffer; all three of which are incorporated by reference herein.

Earlier instruments were limited to laser interferometers, which integrated length measurements in the radial direction by fringe counting. Later instruments include absolute distance measurement, which allows the beam to switch between a plurality of targets, or for the beam to be broken. See *Large-Scale Metrology—An Update* Estler, Edmundson, Peggs, and Parker, Annals of the CIRP, Vol. 51/2/2002, which is incorporated by reference herein, for a review of the technology.

These instruments are calibrated under The American Society of Mechanical Engineers Standard ASME B89.4.19-2006, incorporated by reference herein. The Foreward to the Standard states;

Performance evaluation of a laser tracker presents challenges different from those associated with conventional Cartesian CMMs. Because of the very large working volume, no full-scale three-dimensional calibrated artifacts exist, and the design of the laser beam steering system is such that individual parametric errors cannot, in general, be isolated and measured individually. For any coordinate measurement system, a fundamental requirement is a test of its ability to realize the SI unit of length, the meter. In a laser tracker, the length scale is often a laser interferometer and usually one does not have a significantly more accurate reference interferometer with which to perform such a test.

For these reasons, the performance evaluation tests in this Standard consist primarily of point-to-point length measurements using calibrated artifacts that can be realized in a number of ways. Measured lengths are compared with manufacturers Maximum Permissible Error (MPE) specifications in order to decide conformance. Realization of the SI meter can be evaluated in a number of ways, including calibration of the laser interferometer, measurement of a series of short calibrated reference lengths, or measurement of a series of long calibrated reference lengths. Procedures are also included for testing the absolute distance measurement (ADM) capability of laser trackers that include this option.

Sources of Error

In order to calibrate an instrument, it is instructive to understand the principles by which the instrument performs its functions. *Electronic Distance Measurement*, J. M. Rueger, Springer-Verlag, third edition, 1990, is a standard reference on Electronic Distance Measurement (EDM). Chapter 6 of *Electronic Distance Measurement*, C. D. Burnside, Blackwell Scientific Publications, Cambridge, Mass., incorporated by reference herein, specifically addresses calibration. *Optical Tooling for Precise Manufacturing and Alignment*, Philip Kissam, McGraw-Hill, 1962; and *The Surveying Handbook*, Russell C. Brinker and Roy Minnick, Chapman & Hall, second edition, 1995 provide useful information on surveying, and angle measurement in particular.

Burnside identifies the three main sources of error in EDM as the: Scale Error, Zero Error, and Cyclic Error. The Scale Error is primarily due to drift in the modulation frequency. The Zero Error is primarily due to error in the zero point of the instrument, i.e., a constant offset in the distance. The cyclic error is primarily due to crosstalk between the modulating electronics and the detected optical signal intermediate frequency, IF, as well as multiple reflections. The Cyclic Error is typically the most subtle source of error and one which the ASME Standard is not particularly sensitive to detect.

In a typical phase measurement instrument, a laser or LED is modulated at $f_1$. The reflected beam is detected and mixed with a frequency $f_2$ offset from $f_1$ by the IF. For example, in U.S. Pat. No. 5,455,670 Optical Electronic Distance Measuring Apparatus with Movable Mirror, to Payne, Parker, and Bradley, incorporated by reference herein, $f_1$=1500.000 MHz, $f_2$=1500.001 MHz, which produces a 1 kHz IF, which is digitized by the electronics. Measurements reduce to measuring the phase difference between the IF and a reference phase of the generating electronics.

If the beam is pointed into free space, with no reflected beam, there will still be a slight constant IF component detected. In a typical measurement, the detected signal will be a combination of the reflected beam in combination with the constant noise signal. If the two are exactly in phase or exactly 180 degrees out of phase, the error in a phase measurement will be zero. If the noise is 90 degrees out of phase, the noise will introduce a slight error in the detected phase.

The net result is that a plot of measured distance vs true distance will exhibit a small sinusoidal residual that is periodic in distance. For example, in the '670 case, there will be a small sinusoidal residual with a period of approximately 100 mm in distance. The amplitude of the error will be sensitive to the amplitude of the reflected signal, i.e., the error will be more significant for distant measurements due to the fact that the noise is a constant and the return signal is lower amplitude for distant targets.

It will be recognized by those skilled in the art that the cyclic errors can most easily be extracted by measuring many points over a distance corresponding to a few cycles rather than widely separated points, where for the '670 case one cycle corresponds to approximately 100 mm.

EDMs can also experience errors due to multiple reflections. These errors produce errors at harmonics of the modulation frequency. For example, in the '670 case, harmonics would be seen at 50 mm, 33.3 mm, etc.

Sources of error in the angle measurements can be due to: the azimuth and elevation encoders, non orthogonality of the azimuth and elevation axes, bearings, servo tuning and control, latency in the timing of the distance and angle measurements for a moving target, hysteresis, etc. For example, if the rotor and stator are not mounted concentric, there will be a cyclic error in angle. If the servo is not properly tuned, there can be lag or oscillations about the commanded position.

Calibrations meeting ASME B89.4.19-2006 specifications are typically performed by the National Institute of Standards and Technology (NIST), or the manufacturer under laboratory conditions. The requirements are beyond the means of most laser tracker users. A simple method for checking a laser tracker in the field, or providing enhanced calibration capabilities in the lab would be desirable.

BRIEF SUMMARY OF THE INVENTION

A method is disclosed whereby a laser-based spherical coordinate measurement system is dynamically calibrated. A mechanical oscillator, such as, but not limited to, a Foucault pendulum is used to generate periodic motions which can be fitted to Fourier series models. The residuals between the experimental measurements and the model can provide information which can be used to calibrate the instrument. The calibration information is used to augment the ASME B89.4.19-2006 standard to improve sensitivity to cyclic errors and include the servo systems.

DETAILED DESCRIPTION OF THE INVENTION

Figure 1:
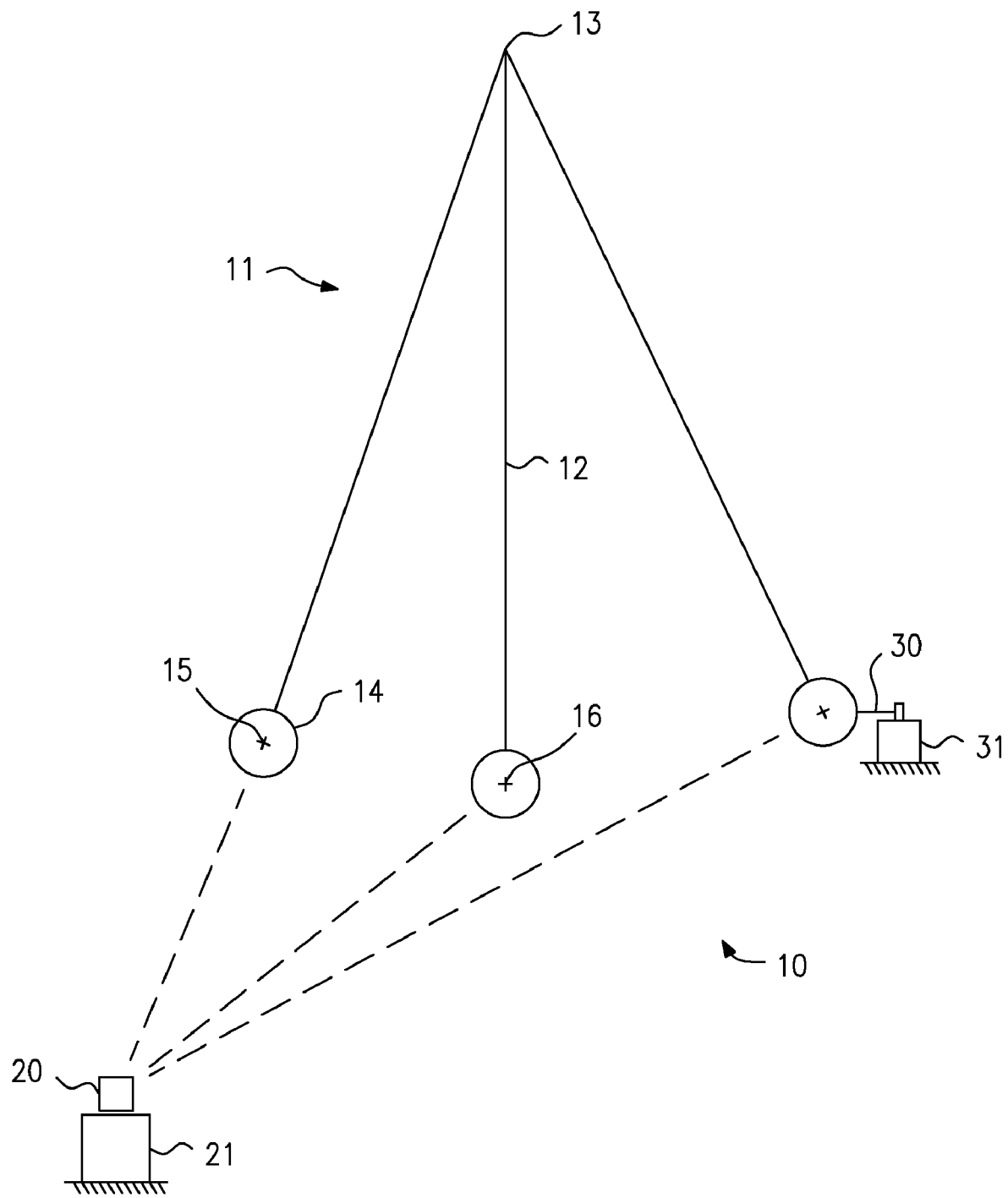
FIG. 1 shows a typical configuration of the invention.

While the invention is described in the preferred embodiment as a laser tracker, and a pendulum, it will be understood that it is not limited to a laser or a pendulum. For example LEDs, microwaves, or other sources of electromagnetic radiation, and other mechanical oscillators may be employed.

In order to detect all of the sources of error, it would be ideal to test a laser tracker in a large volume of known coordinates, and under dynamic tracking conditions, i.e., include the servo system in the calibration. Due to the large volume, it is non trivial to generate such a rich set of known coordinates and trajectories. The ASME standard includes provisions for Long Reference Lengths for Ranging Tests in section 6.4.4. These tests expose cyclic errors, but require an additional laser interferometer, and a precision rail. Angle measurements require precision length artifacts. The standard is silent as to dynamics of the servo system.

Poirier, and Yaghjian addressed a related problem in U.S. Pat. No. 4,704,614 Apparatus for Scanning and Measuring the Near-Field Radiation of an Antenna, incorporated by reference herein. They used a Foucault pendulum to scan the radiation pattern of a large antenna by using the rotation of the earth to produce a relative rotation over the field of the stationary antenna.

Mechanical oscillators, such as, but not limited to, pendulums are well known in the art that oscillate at well behaved frequencies. For example, a simple pendulum oscillates, to a first approximation, with a period $$T = 2\pi \left(\frac{L}{g}\right)^{1/2} \quad (1)$$

where T is the period, L is the length, and g is the acceleration of gravity.

For small oscillations, T is independent of the amplitude of the oscillation. It is well known that for larger amplitudes, higher order terms must be included, as taught in U.S. Pat. No. 4,738,032 Inertial Pendulum to Elmer, included by reference herein. Moreover, g depends on the latitude, elevation, earth composition, proximity to mountains, etc. However, mechanical oscillations are repeatable enough to serve as a reference for time measurement, and measurements of g, and as will be shown hereinbelow can be adapted for calibrating a laser tracker.

The Foucault pendulum, as described in Vol. 5, Encyclopaedic Dictionary of Physics, incorporated by reference herein, typically is constructed by a spherically symmetric mass supported by a music wire pivoting on knife edge bearings. By carefully releasing the mass from an initial position, the pendulum will oscillate in a plane. As Foucault demonstrated, the plane of the pendulum will rotate, with respect to the earth at an angular velocity $$\omega \sin \lambda \quad (2)$$

where $\omega$ is the angular velocity of the earth, and $\lambda$ is the latitude.

As described in the same reference, an impulse normal to the plane, or an imperfect release, will result in an elliptical path which will rotate at an angular speed roughly proportional to the area of the ellipse, i.e., not in a simple vertical plane. Under ideal conditions, the elliptical path produces a circular path. It will be recognized that in addition to oscillating in the polar coordinates, the system will oscillate slightly in the radial direction due to oscillations in the forces on the support wire, the bearing mechanism, and the natural frequency vibration of the music wire.

Despite all the complexities of the motion of the Foucault pendulum, the motions are deterministic, and in combination with accurate time synchronization, can be used to generate a large-scale 3-D calibration mechanism for laser trackers which provides a rich set of data. For even a modest length L, the pendulum maps out a volume sufficient to map multiple cycles of the EDM. For a factory environment, lengths L of tens of meters are practical.

For the purpose of this discussion, consider the following gedanken experiment generally depicted as 10 in FIG. 1 Assume a Foucault pendulum 11 suspended by a wire 12 hanging from a precision bearing 13, such as a compound knife edge, with a mass 14 with a center of mass 15. Assume a virtual omnidirectional retroreflector 16, as will be explained in more detail hereinbelow, is virtually at the center of mass 15. Assume an absolute, or interferometer, laser tracker 20 mounted on a stable mount 21 follows the retroreflector 16. Starting at the rest position of the pendulum, acquire distance r, azimuth angle $\alpha$, elevation angle $\theta$, and time t measurements in the tracker coordinate system, e.g., (r,$\alpha$,$\theta$,t).

While tracking, translate the pendulum to a release fixture 30, such as a string, attached to a stable mount 31 where the pendulum 11 is carefully released, by burning the string (as performed by Foucault in the original experiment), so as to minimize rotation about the L axis 12. The laser tracker 20 will map a complex path incorporating all of the complexities described in the references cited hereinabove.

It will be recognized by those skilled in the art that r(t), $\alpha$(t), and $\theta$(t) will be smooth functions that can be fit to periodic functions, such as a power series or harmonic sinusoidal functions, i.e., a Fourier series. This is relatively easy to do with commercially available software such as Mathematica™, available from Wolfram Research, Champaign, Ill. It will also be recognized that (r,$\alpha$,$\theta$,t) can be converted into Cartesian coordinates (x,y,z,t), which will also be smooth functions x(t), y(t), and z(t), which can also be fit to harmonic sinusoidal functions. The motions can also be fit advantageously to a generalized coordinate system (as would be used in solving by Lagrange's equations in a classical mechanics text), (L,$\beta$,$\gamma$,t), where L is the length from the support bearing to the retroreflector (at the center of mass), and $\beta$ and $\gamma$ are spherical polar coordinates, which can also be fit to smooth harmonic sinusoidal functions $L(t)$, $\beta(t)$, and $\gamma(t)$.

For a perfect laser tracker, and an ideal pendulum moving in a vertical place, $L(t)$ will be a constant, and $\beta(t)$, and $\gamma(t)$ will be sinusoidal functions of period T where $$T = 2\pi \left(\frac{L}{g}\right)^{1/2} \quad (3)$$

or $$L(t) \approx L \quad (4)$$

$$\beta(t) \approx A_1 \sin(2\pi t/T + \phi_1) \quad (5)$$

$$\gamma(t) \approx A_2 \sin(2\pi t/T + \phi_2) \quad (6)$$

where $A_1$ and $A_2$ are amplitudes and $\phi_1$ and $\phi_2$ are phase angles which depend on the initial conditions at release. In the special case $$A_1 = A_2 \quad (7)$$

$$|\phi_2 - \phi_1| = \pi/2 \quad (8)$$

the pendulum will map a circle. In the more general case the pendulum will map an ellipse, and higher order harmonic terms will be necessary to produce a good fit. For larger amplitudes, T will depend on $A_1$ and $A_2$.

It is not necessary to know a priori the actual values for L, g, T, $A_1$, $A_2$, $\phi_1$, $\phi_2$, or the additional terms needed for a best fit, in order to calibrate some aspects of the laser tracker. The facts that $L(t)$, $\beta(t)$ and $\gamma(t)$ are all periodic functions of the same period T, and are all smooth functions are sufficient to identify some errors.

Symmetry can be used as a constraint in the fitting algorithm. For a well behaved Foucault pendulum, the first principles of the physics dictates that the motions should be symmetrical about the rest position, i.e., $\beta=0$ and $\gamma=0$. For example, if $\beta(t)$ passes through the origin at t'

$$\beta(t'+\tau) = -\beta(t'-\tau) \quad (9)$$

and if $\gamma(t)$ passes through the origin at t''

$$\gamma(t''+\tau) = -\gamma(t''-\tau). \quad (10)$$

The fact that $L(t)$, $\beta(t)$ and $\gamma(t)$ are all periodic functions of the same period T can also be used as a constraint in the fitting algorithm.

The residuals of the measured data to the best fit functions will be an indication of the instrument errors. Moreover, those skilled in the art will understand how the errors relate to the sources of the errors.

Any anomalies due to the pendulum should be repeatable and invariant for different locations of the tracker. Since the period is fixed by the length, the maximum velocity can be adjusted by the release position, and used to expose tracker servo problems. Multiple trackers may be used to check against each other, or in cooperation to produce coordinates based on lengths alone (multilateration), or angles alone (triangulation), or combinations. Residuals between the various fits will expose errors.

Most trackers can not track at the zenith angle. However, since the motions are well behaved, an absolute distance instrument can predict the location at a future time and pick up the target after rotating 180 degrees in azimuth. For example, an instrument located directly under the pendulum could easily detect zero point errors and cyclic encoder errors by plunging the instrument, as is typically performed to test a theodolite.

In an actual reduction to practice, the problem of mechanically locating a retroreflector at the center of mass is non trival due to the Abbé error. However, Bridges, Brown, and Ackerson in U.S. Pat. No. 5,861,956 Retroreflector for use with Tooling Ball, resolve the problem for a single tracker; and Parker in U.S. Pat. No. 7,110,053 Multidirectional Retroreflectors, both of which are incorporated by reference herein, resolves the problem for multiple trackers or large motions which produce large tracking angles. It will be understood that in either architecture, care must be taken to dynamically balance the pendulum for the additional retroreflector(s).

It will be noted that the spirit and scope of the invention is not limited to a Foucault pendulum. For example, the same principles can be applied to; plane pendulums, torsional pendulums, compound pendulums, a mass hanging on a spring, tuning forks, vibrating beams, etc. It will also be noted that the invention is not limited to a laser tracker. For example, the method could also be employed to calibrate a motorized total station surveying instrument.

What is claimed is:

1. A method comprising;
   (a) producing mechanical oscillations by a first oscillator, wherein said first oscillator is placed in motion;
   (b) retroreflecting electromagnetic radiation from a first virtual point mechanically fixed to said first oscillator; wherein said first virtual point is also placed in motion;
   (c) measuring time;
   (d) tracking said first virtual point from a first spherical coordinate measurement system;
   (e) measuring from said first spherical coordinate measurement system to said first virtual point, at a plurality of times $t_n$, to produce a plurality of measurements $M_{1,n}$, wherein each element n of said $M_{1,n}$ is an ordered set comprising; $t_n$ and at least one parameter synchronized with said $t_n$ from the group consisting of; range $r_{1,n}$, a first angle $\alpha_{1,n}$, a second angle $\theta_{1,n}$, and combinations thereof;
   (f) storing said plurality of $M_{1,n}$ by a processor and a memory storage device;
   (g) determining at least one calibration parameter of said first spherical coordinate measurement system based at least in part on said $M_{1,n}$; and
   (h) storing said calibration parameter.

2. The method of claim 1 wherein said first oscillator is a pendulum.

3. The method of claim 1 wherein said first oscillator is a mass suspended by a spring.

4. The method of claim 1 wherein said first spherical coordinate measurement system is an absolute distance laser tracker.

5. The method of claim 1 wherein said first spherical coordinate measurement system is an interferometer distance laser tracker.

6. The method of claim 1 wherein said first spherical coordinate measurement system is an automated total station.

7. The method of claim 1 wherein said determining comprises fitting said $M_{1,n}$ to a first mathematical function.

8. The method of claim 7 wherein said first mathematical function is a Fourier series.

9. The method of claim 7 wherein said first mathematical function comprises functions for a length and two angles.

10. The method of claim 7 further comprises computing the residual between $M_{1,n}$ and said first mathematical function.

11. The method of claim 1 further comprising:
(a) tracking said first virtual point from a second spherical coordinate measurement system;
(b) measuring from said second spherical coordinate measurement system to said first virtual point, at a plurality of times $t_n$, to produce a plurality of measurements $M_{2,n}$, wherein each element n of said $M_{2,n}$ is an ordered set comprising; $t_n$ and at least one parameter synchronized with said $t_n$ from the group consisting of; range $r_{2,n}$, a first angle $\alpha_{2,n}$, a second angle $\theta_{2,n}$, and combinations thereof;
(c) storing said plurality of $M_{2,n}$ by a processor and a memory storage device;
(d) determining at least one calibration parameter of said first spherical coordinate measurement system based at least in part on said $M_{1,n}$ and said $M_{2,n}$.

12. The method of claim 11 further comprising:
(a) tracking said first virtual point from a third spherical coordinate measurement system;
(b) measuring from said third spherical coordinate measurement system to said first virtual point, at a plurality of times $t_n$, to produce a plurality of measurements $M_{3,n}$, wherein each element n of said $M_{3,n}$ is an ordered set comprising; $t_n$ and at least one parameter synchronized with said $t_n$ from the group consisting of; range $r_{3,n}$, a first angle $\alpha_{3,n}$, a second angle $\theta_{3,n}$, and combinations thereof;
(c) storing said plurality of $M_{3,n}$ by a processor and a memory storage device;
(d) determining at least one calibration parameter of said first spherical coordinate measurement system based at least in part on said $M_{1,n}$, said $M_{2,n}$, and $M_{3,n}$.

13. The method of claim 12 further comprising:
(a) tracking said first virtual point from a fourth spherical coordinate measurement system;
(b) measuring from said fourth spherical coordinate measurement system to said first virtual point, at a plurality of times $t_n$, to produce a plurality of measurements $M_{4,n}$, wherein each element n of said $M_{4,n}$ is an ordered set comprising; $t_n$ and at least one parameter synchronized with said $t_n$ from the group consisting of; range $r_{4,n}$, a first angle $\alpha_{4,n}$, a second angle $\theta_{4,n}$, and combinations thereof;
(c) storing said plurality of $M_{4,n}$ by a processor and a memory storage device;
(d) determining at least one calibration parameter of said first spherical coordinate measurement system based at least in part on said $M_{1,n}$, said $M_{2,n}$, said $M_{3,n}$, and said $M_{4,n}$.

14. The method of claim 1 wherein said calibration parameter is a cyclic error.

15. The method of claim 1 wherein said calibration parameter is a scale error.

16. The method of claim 1 wherein said calibration parameter is a servo system tuning and control error.

17. The method of claim 1 wherein said calibration parameter is a hysteresis error.

18. The method of claim 1 wherein said calibration parameter is a multiple reflection error.

* * * * *